June 23, 1942.  W. A. HUFFSTICKLER  2,287,311
KNOT TYING DEVICE
Filed Aug. 19, 1940  6 Sheets-Sheet 5
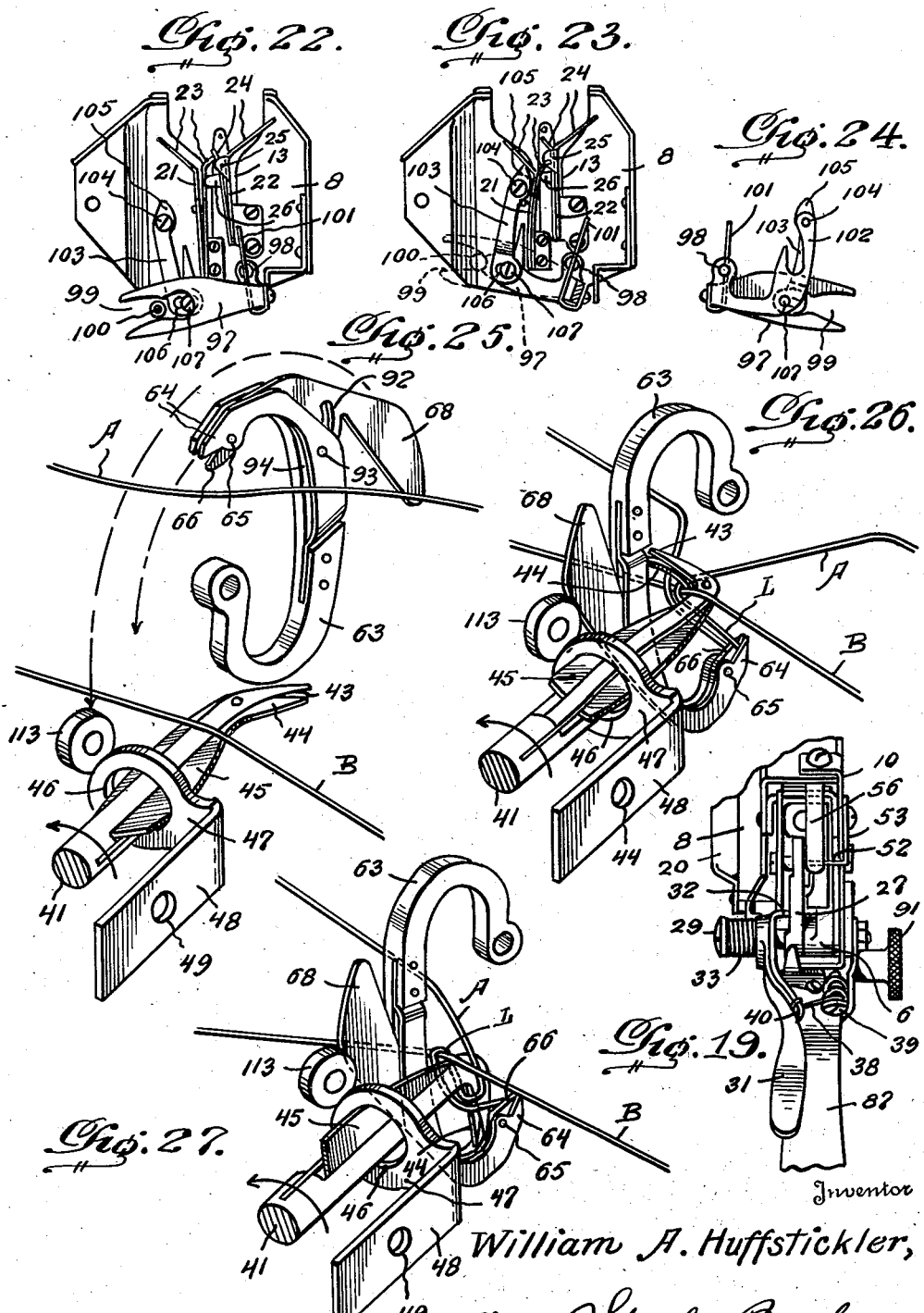
Inventor
William A. Huffstickler,
By J. Stanley Burch
Attorney June 23, 1942.  W. A. HUFFSTICKLER  2,287,311
KNOT TYING DEVICE
Filed Aug. 19, 1940  6 Sheets-Sheet 6

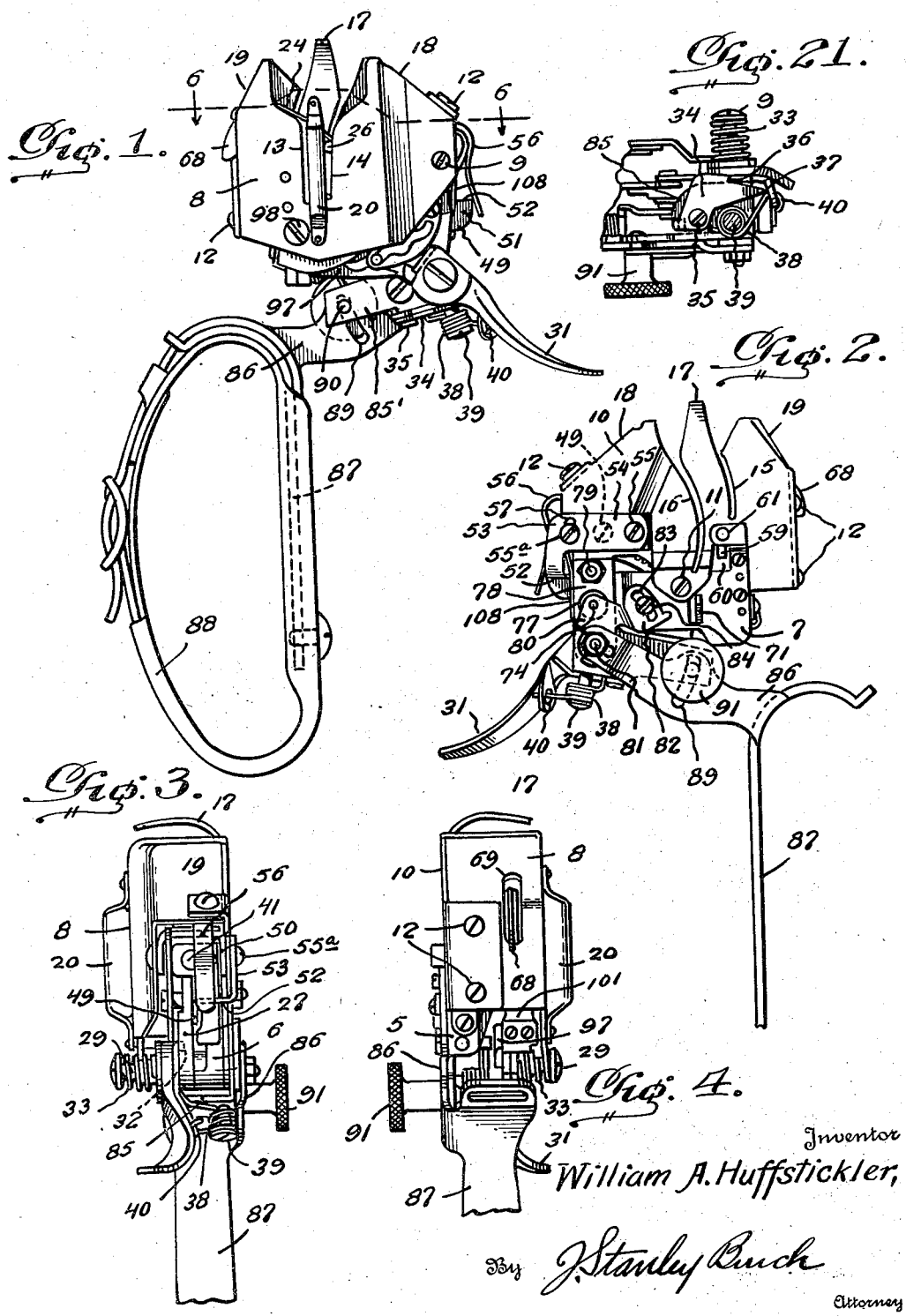

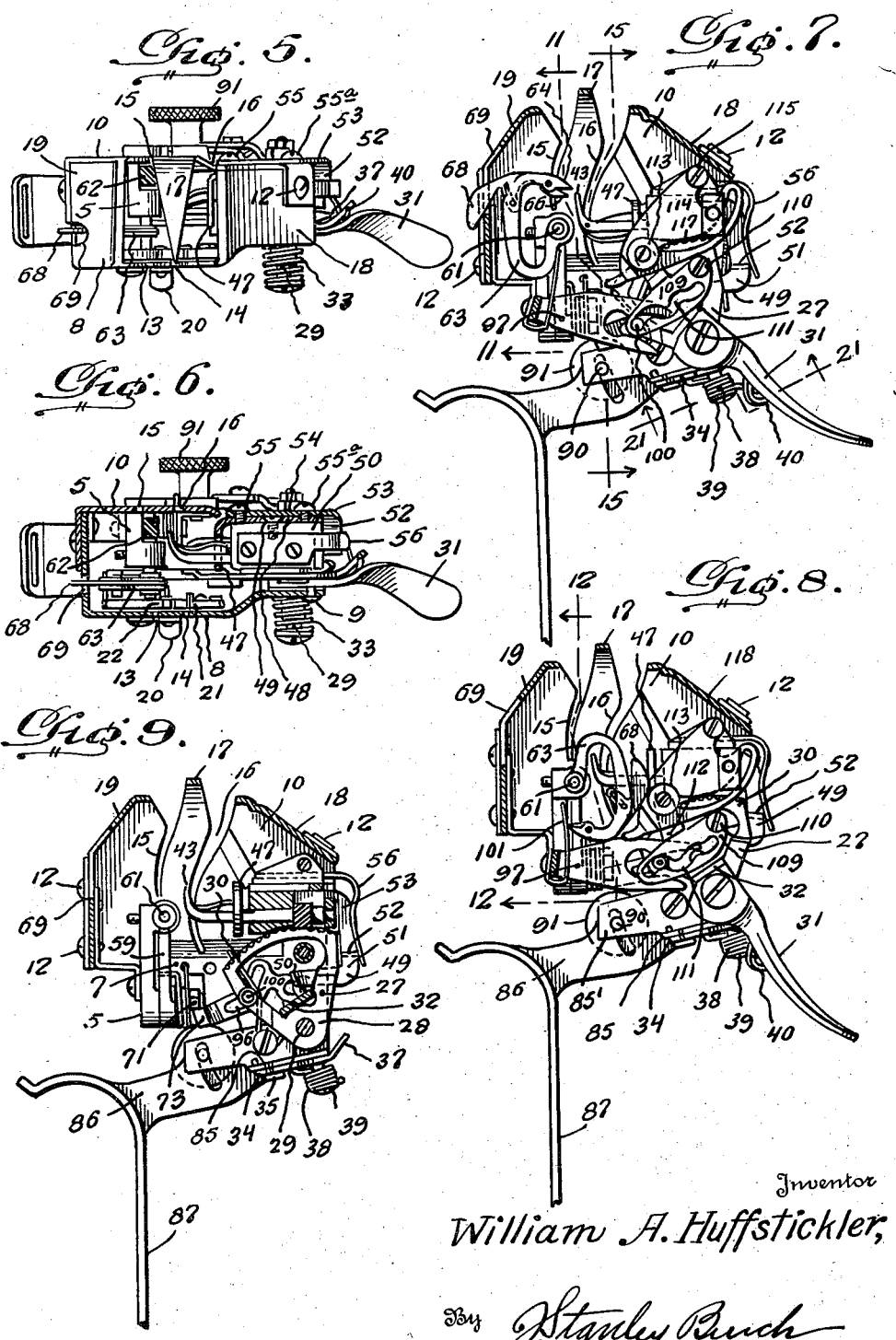

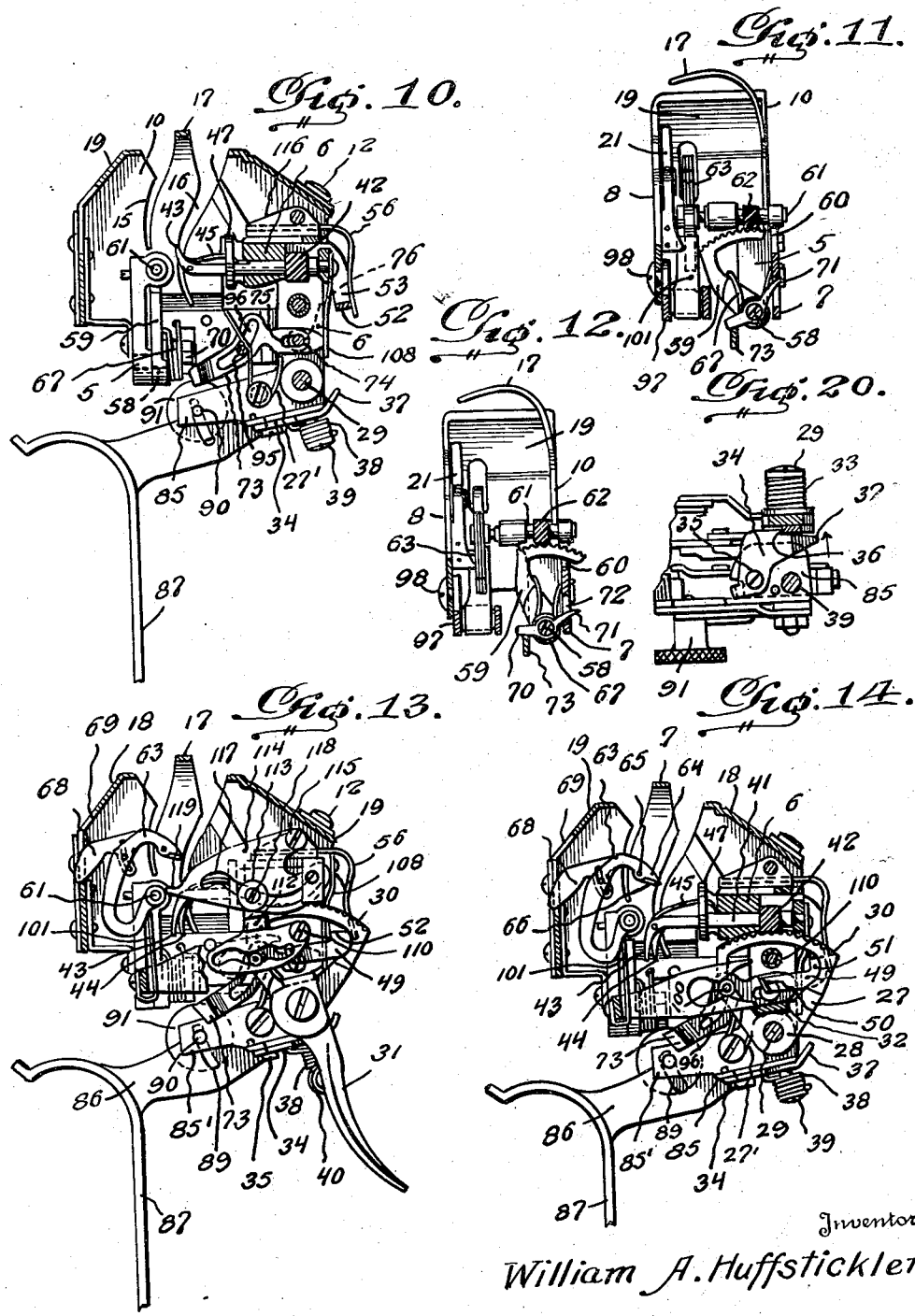

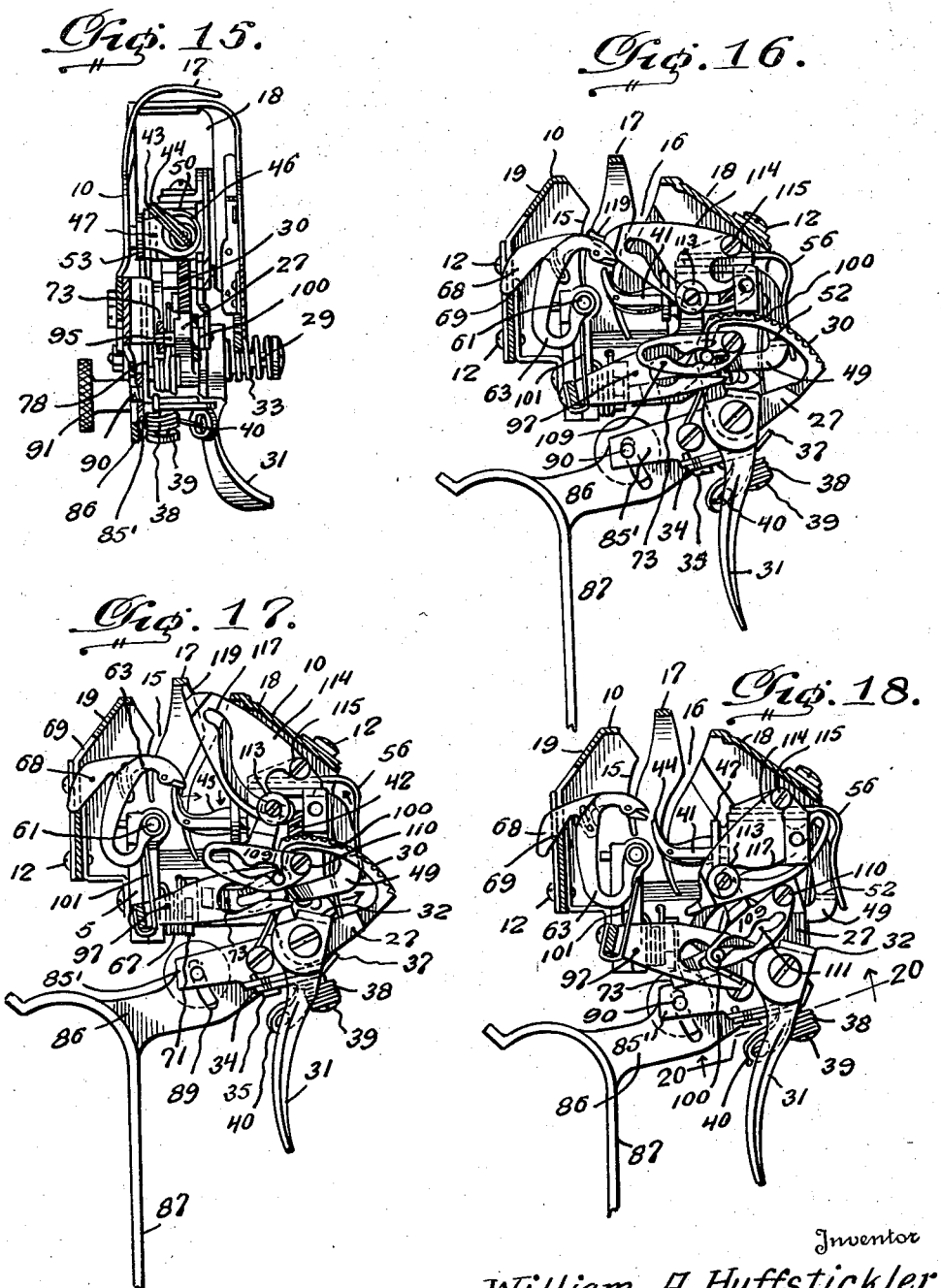

Inventor
William A. Huffstickler,
By J. Stanley Bunch
Attorney

Patented June 23, 1942

2,287,311

UNITED STATES PATENT OFFICE 2,287,311

KNOT TYING DEVICE

William A. Huffstickler, Gastonia, N. C., assignor to Knotters, Incorporated, West Gastonia, N. C., a corporation of North Carolina Application August 19, 1940, Serial No. 353,283

13 Claims. (Cl. 289—3)

This invention relates to a hand device for tying a weaver's knot.

A general object of the present invention is to provide an efficient device for producing a true weaver's knot, and in which novel and improved mechanism is provided to perform the operations for producing said knot.

A specific object of the present invention is to provide a knot tying device in which the knot is partially formed on the shank of a tying bill, and in which means is provided for forcing the partially formed knot from the shank of the bill to the bill proper, and for then stripping the partially formed knot from the bill proper to effect the final knot forming and tightening operation and at the same time elevate the threads so that the device may be readily disengaged therefrom without the need of manually grasping and elevating the threads for this purpose.

A still further object of the present invention is to provide a knotter of the above kind including knot tying instrumentalities, an operating lever or trigger for said instrumentalities releasably connected to the latter, yieldable means for automatically returning said instrumentalities to normal or initial positions, and means to automatically release said operating lever or trigger from said instrumentalities upon completion of the knot-forming operations of the latter.

The present invention also embodies many other advantageous specific features and details of construction which will become apparent from the following description when considered in connection with the accompanying drawings.

Referring to the drawings, which illustrate a preferred form of the present invention:

Figure 1 is a side elevational view of a knot tying device embodying the present invention.

Figure 2 is a similar view looking at the opposite side of the device and with the leather handle member removed.

Figure 3 is a fragmentary elevation looking toward the left of Figure 1.

Figure 4 is a view similar to Figure 3 looking toward the right of Figure 1.

Figure 5 is a top plan view of the device as shown in Figure 1.

Figure 6 is a horizontal section on line 6—6 of Figure 1.

Figure 7 is a vertical longitudinal sectional view of the device as shown in Figure 1, with the leather handle member removed.

Figure 8 is a view similar to Figure 7, but with the parts shifted as in the initial step in the knot forming operation.

Figure 9 is a vertical section similar to Figure 8, with parts removed to reveal other parts.

Figure 10 is a view similar to Figure 9 with still further parts removed to reveal still other parts.

Figure 11 is a vertical section on line 11—11 of Figure 7.

Figure 12 is a vertical section on line 12—12 of Figure 8.

Figure 13 is a view similar to Figure 8 with the parts shifted as in a second step of the knot forming operation.

Figure 14 is a view similar to Figure 13 with parts removed to reveal other parts.

Figure 15 is a vertical section on line 15—15 of Figure 7.

Figure 16 is a view similar to Figure 13 with the parts shifted further as in a third step of the knot forming operation.

Figure 17 is a view similar to Figure 16 with the parts shifted still further as in a fourth step of the knot forming operation.

Figure 18 is a view similar to Figure 17 with the parts moved still further as in a fifth step of the knot forming operation, the tying instrumentalities having been returned to normal position before release of the operating lever or trigger.

Figure 19 is a view similar to Figure 4 of the device with the parts positioned as in Figure 18.

Figure 20 is a fragmentary bottom plan view with the parts positioned as in Figure 17 immediately prior to release of the operating lever or trigger from the knot forming instrumentalities.

Figure 21 is a view similar to Figure 20 with the parts in the normal position of Figures 1 to 7 inclusive.

Figure 22 is an inside elevational view of the front cover member for the knot tying instrumentalities, together with the associated elements which control the instrumentality for doubling one thread around another and which controls gripping of the thread laid across the device preparatory to tying the same.

Figure 23 is a view similar to Figure 22 with the parts moved to the position of Figure 13 wherein the threads are gripped during the knot tying operation.

Figure 24 shows movable parts of Figure 22 as viewed from the reverse side, the casing member being omitted; and Figures 25 to 31 inclusive are diagrammatic perspective views of parts of the device in varying positions, and illustrate the evolution of the knot.

Figure 28:
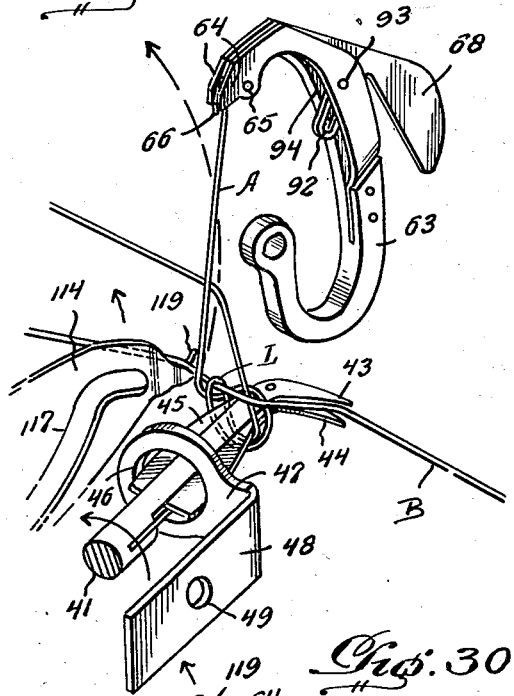

Referring to the drawings, the main frame of the device which supports the operating mechanism comprises vertical elongated end members 5 and 6, and a rear side frame plate 7 rigidly secured at its ends to the lower portions of the members 5 and 6 and rigidly connecting the latter in spaced parallel relation. Most of the movable parts of the device are disposed within a casing composed of a front section 8 fastened at 9 to the frame member 6 and a rear section 10 fastened at 11 to the frame plate 7, the casing sections having portions overlapped at opposite ends and fastened together as at 12. The casing sections 8 and 10 are provided respectively with opposite slots 13, 14 and 15, 16, the portion between the slots 13 and 14 being tapered substantially to a point at its upper end, and the portion between the slots 15 and 16 having an inward horizontal arm or extension 17 which is also tapered substantially to a point at its forward free end that terminates adjacent but spaced above the portion of the section 8 between the slots 13 and 14. At opposite sides of the arm 17, the casing has downwardly diverging top walls 18 and 19 which are preferably formed integral with the casing section 8, and in this way guards are provided for protection against the operator's fingers entering the space between the casing sections and for helping to guide the threads into the slots 13 and 15 and 14 and 16 respectively. The bottom of slot 16 is substantially lower than the bottom of slot 15, and the slots 15 and 16 are preferably curved as shown in Figure 2, whereas the slots 13 and 14 are vertical and substantially straight as shown in Figure 1. A narrow hollow elongated member 20 is preferably attached to the portion between the slots 13 and 14 so as to project forwardly and provide a clearly visible sight which will assist in ready engagement of the threads in the slots 13 and 14. Fixedly secured on the inner face of the front wall of the casing section 8, as shown more clearly in Figures 22 and 23, are thread-gripping clamps 21 and 22. These clamps are respectively disposed along corresponding sides of the slots 13 and 14 and are preferably composed of return-bent strips of resilient metal having upwardly diverging end portions 23 and 24 at the upper ends of the slots 13 and 14. Also, the clamp 22 has a lateral lug 25 on one leg thereof extending across the other leg of the same near the top of this clamp so that the thread initially laid across the device at the slot 13 will be initially held at the top of the latter slot. The clamps 21 and 22 are normally expanded so that the legs of the same are normally spaced apart at the top, and the shorter end 23 of the clamp 21 adjacent the clamp 22 is disposed to engage the adjacent shorter end 24 of said clamp 22, as shown more clearly in Figure 22. The purpose of this is to provide means whereby when one leg of clamp 21 is forced toward the other leg thereof, one thread arranged in slot 14 will be gripped, and whereby, upon flexing the legs of clamp 21 toward the clamp 22, the legs of said clamp 22 will be forced together so as to clamp the other thread arranged in the slot 13. To aid in the latter action, the leg of clamp 22 adjacent clamp 21 is also provided with a laterally projecting lug 26 which engages the adjacent leg of clamp 21 as shown in Figure 22. It is pointed out that the arrangement thus described provides for initially supporting one thread in an elevated position when extended across the frame and casing at the slots 13 and 15, the other thread being supported at a lower position in a different vertical plane when extended across the frame within the slots 14 and 16. The means for flexing the clamp 21 so as to force the legs thereof together and then force the legs of the clamp 22 together, will be later described.

A driving member 27 for operating the mechanism is pivotally mounted as at 28 on a spindle formed by a bolt 29 carried by and projecting forwardly from the lower end of the frame member 6. A suitable spring 27' is provided to return member 27 to normal position, and said member 27 carries a gear rack segment 30. A trigger or lever 31 provides means for rotating the member 27 in a clockwise direction as viewed in Figures 7 to 10 inclusive, 13, 14, 16, 17 and 18. The trigger 31 is pivotally and slidably mounted on the bolt 29 and has a rearwardly directed lug 32 at its upper end normally engaged between the lower end portions of the upwardly diverging side legs of the member 27, a helical compression spring 33 being disposed on the bolt 29 for urging the trigger 31 toward the member 27 to cause this normal engagement. However, it is intended that upon completion of the knot-tying operation, the trigger 31 will be automatically released from the member 27 so as to allow the latter and the various knot-tying instrumentalities of the device to instantaneously return to normal or initial position. For this purpose, a lever plate 34 is pivotally mounted as at 35 directly in the rear of the trigger 31 below the pivot or bolt 29, and this lever plate has a shoulder 36 arranged in the path of a part of the trigger 31, as well as a projecting end 37 extending outwardly and upwardly toward the right hand end of the device along the rear side of said trigger. Thus, at the proper time, the trigger 31 will engage the shoulder 36 of the lever plate 34 so as to swing the latter and cause its projecting end 37 to impinge the adjacent upper end portion of said trigger 31, thereby forcing the latter forwardly away from the driving member 27 against the action of spring 33 and so as to disengage the lug 32 from said member 27. As soon as this disengagement is effected, at the completion of the knot-tying operation, the member 27 and the various knot-tying instrumentalities of the device will be allowed to return to normal or initial positions thereof under the influence of suitable springs as will be later made apparent. In order to return the trigger 31 to its normal or initial position after the above has occurred and upon subsequent release of said trigger, a spring 38 is coiled about a suitable stud 39 supported at the bottom of the frame rearwardly of the trigger 31, one end of said spring being suitably anchored to the frame and the other end of the spring being anchored to the trigger as at 40. This construction will be clearly apparent from Figures 20 and 21 when considered with the remaining figures, particularly such figures as 7 to 10 inclusive, and 19.

Figure 30:
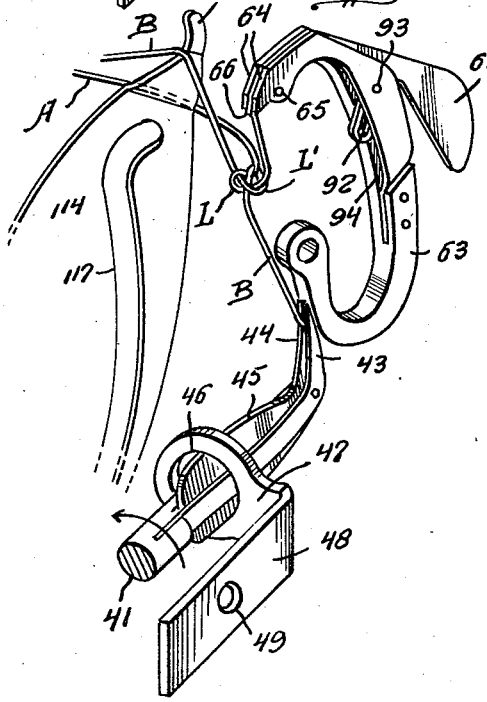
Figure 31:
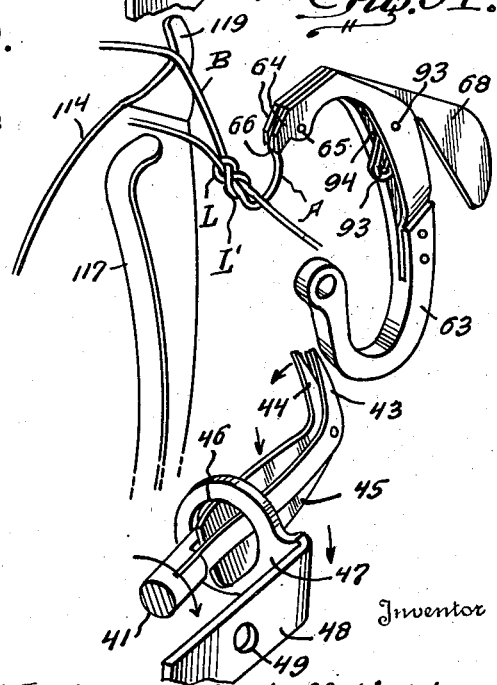

A rotary driven shaft 41 is journaled at one end in the top of the frame member 6, and secured on this end of shaft 41 within a recess of frame member 6 is a pinion gear 42 meshing with the rack 30. The other end of shaft 41 forms a shank of a tying bill which comprises cooperating jaws as at 43 and 44. The jaw 44 is pivoted in the usual way and provided with a rearwardly extending enlargement 45 whose rear end is arranged within a circular opening 46 provided in the forwardly extending end portion 47 of an angular plate whose other end portion 48 is pivoted intermediate its ends as at 49 to the vertical flange of an angular plate 50 secured to the upper portion of the frame member 6. One flange of plate 50 extends across the top of the frame member 6, while the other flange is vertically disposed against the rear side of the upper portion of said frame member 6 as more clearly shown in Figures 6, 9 and 15. The opening 46 is eccentric to the shaft 41 and is so formed that when the tying bill is in the position of Figures 13 and 27 and 28, the jaws thereof will be separated as shown, and when the tying bill reaches the position of Figures 16 and 17 or Figures 29 and 30, the pivotal jaw 44 will be in substantial register with the outside jaws at 43 so that the bill assumes a closed position. It will of course be understood that the tying bill is normally substantially closed as in Figures 8 and 25, and in moving from such position to the position of Figure 30 opens and closes. The bill then remains closed until it reaches a position slightly past that of Figures 17 and 30, whereupon the bill is caused to open for releasing the thread as shown in Figure 31, by a means to be presently described. The latter means includes an arm 49 which extends behind the driving member 27 and has a forwardly directed free end 50 arranged in the path of the left hand leg or portion of the driving member 27 as viewed in Figure 14. The arm 49 is rigidly connected by an upwardly extending portion 51, a rearwardly extending portion 52, and further upwardly extending portion 53 as shown more clearly in Figures 1, 10 and 14, with a plate 54 secured by screws 55 and 55a to the end portion 48 of the angular plate above referred to. A spring 56 attached at its upper end to the top of the frame member 6 is arranged so that its lower end impinges the part 52 for normally positioning the member 47, 48 as in Figure 28 and the arm 49 as in Figure 14. Thus, when the driving member 27 has been swung from the position of Figure 9 to the position of Figure 17 which corresponds to Figure 30, the side portion of member 27 which is at the left of Figure 14 engages the arm 49 and shifts the latter against the action of spring 56 so as to swing the member 47, 48 in a direction wherein the flange or portion 47 is lowered. This actuates the enlargement 45 of the pivotal jaw 44 so as to open the tying bill as illustrated in Figure 31, thereby releasing the thread engaged by the bill at the end of the knot-tying operation. The screw 55a extends through a vertically elongated slot 57 in the plate 54 so that by loosening the screw 55a, said plate 54 may be pivotally swung about the bolt 55 for angularly adjusting the plate 54 relative to the flange 48, thereby securing an accurate proper relationship between the parts 48 and 54.

It will be noted that the shaft 41 extends inwardly between the casing sections 8 and 10, with the tying bill arranged at a point intermediate vertical planes respectively intersecting the upper portion of slot 15 and the upper portion of slot 16. To the lower end of frame member 5 is pivoted at 58 the lower end of a gear segment 59 arranged for swinging movement in a vertical plane transversely of the frame, an end of the gear segment 59 being movable through a space 60 between the casing section 10 and the frame plate 7 as shown more clearly in Figures 2, 11 and 12. Journaled in the upper end of frame member 5 is one end of a transverse horizontal shaft 61 on which is secured a pinion gear 62 meshing with the segment gear 59. Secured on the other or inner end of shaft 61 is a C-shaped member 63 forming part of a device for looping one thread transversely around another thread and for shearing and clamping said one or first-named thread. The member 63 is secured at one end on the shaft 61 and is provided at the other end with two outer jaws at 64 between which is pivoted at 65 a movable jaw 66. The arrangement is such that when the gear segment 59 is swung rearwardly or to the right of Figure 11, shaft 61 is rotated to swing member 59 from the position of Figures 7 and 25 to the position of Figures 8 and 26. The normal position of the parts shown in Figure 11 is effected by means of a torsion spring 67 coiled about the pivot pin 58 of gear segment 59 and having an end engaging said gear segment 59 as clearly shown in Figures 9 and 11, the other end of spring 67 being engaged with the frame plate 7. The movable or pivoted jaw 66 has an outwardly projecting tail piece 68 arranged to pass outwardly through and engage the bottom wall of a slot in the adjacent end wall of the casing as at 69, when the member 63 returns to its normal position, for opening the jaw 66 relative to the jaws 64. This is clearly illustrated in Figure 7, and it is noted when the thread A is initially extended across the casing and supported in an elevated position in the slot 15 and the upper portion of slot 13 by the lug 25 of clamp 22, the portion of such thread A extending between the front and rear walls of the casing will be adjacent and alined with the space between the jaws 64 and 66 as shown in Figure 25. Thus, the thread A will be looped around thread B by the member 63 when the latter is swung from the normal position of Figure 25 to the position of Figure 26, which respectively correspond to the positions of Figures 7 and 8. It will of course be further understood that at this time the other thread B is supported in a different vertical plane and at a lower elevation in the bottoms of slots 14 and 16, the thread B extending behind the bill and over its shaft or shank as also shown in Figure 25. In traveling from the position of Figures 7 and 25 to the position of Figures 8 and 26, the member 63 carries the adjacent portion of thread A over the lug 25 of clamp 22 so that such adjacent portion of thread A may enter and lower in the slot 13 and clamp 22. It will be understood that the threads are laid across the device so that the tail ends of such threads are those which extend outwardly or rearwardly from the rear frame plate 7 and the rear wall of the casing in which slots 15 and 16 are formed.

Rigid and movable with the pivoted end of gear segment 59 is a lever having a forwardly projecting arm 70 and a rearwardly projecting arm 71, the arm 71 being movable in a vertically elongated slot 72 in the frame plate 7 so that rocking movement of the lever 70, 71 is properly limited. Pivotally and slidably mounted at one end is an actuating lever 73 for lever 70, 71 so as to actuate gear segment 59. This actuating lever 73 is engaged normally beneath the forwardly projecting arm 70 of the lever including the arms 70 and 71, so that upon upward movement of actuating lever 73, the gear segment 59 will be swung to the right of Figure 11 as shown in Figure 12. The mounting of actuating arm or lever 73 comprises a pin 74 extending through a longitudinal elongated slot 75 in one end of said actuating arm 73 as shown more clearly in Figure 10, the other end of said arm 73 being arranged to engage the lever arm 70 as above mentioned. The pin 74 extends through and is laterally movable in an opening 76 provided through frame member 6, as well as in an opening 77 provided in a vertical plate 78 bolted at its upper end as at 79 to the rear of frame member 6 as shown in Figure 2. Also, pin 74 has its rear end fixed to a plate 80 pivoted at its lower end on a bolt 81 carried by and projecting rearwardly from the frame member 6 and extending loosely through an opening in the lower end of the vertical plate 78. The plate 80 has an arm 82 extending laterally therefrom and provided with an elongated arcuate slot 83 receiving a set screw 84 which is threaded into the frame plate 7. The lower end of plate 78 has a horizontal forwardly extending flange 85 to the underside of which the lever plate 34 is pivoted at 35 as hereinbefore described. Thus, by loosening the nut on the bolts 79 and 81, the plate 77 may be adjustably swung about the bolt 79 so as to position the lever plate 34 in accurate proper relation with respect to the trigger 31. Also, by loosening the set screw 84 when the nut on bolt 81 is loose, the plate 80 may be swung to laterally adjust the pin 74 for accurately positioning the latter so that the lever arm 73 is properly limited to the correct normal position. This simply facilitates manufacture and assembly with parts accurately set so that predetermined precision methods of manufacture need not be resorted to. Once the parts have been properly set, the nuts on bolts 79 and 81 will be tightened and the set screw 84 will be tightened so as to maintain or secure these adjustments. The plate 78 is also provided at its lower end with a laterally projecting arm 85' against which is disposed an angular arm 86 of a metallic supporting member 87 for a leather handle member 88. The free end of the arm 86 is engaged over the bolt 81 beneath the nut of the latter and against the plate 80, and said arm 86 has an arcuate elongated slot 89 through which extends a clamping screw 90 having an operating handle 91 and threaded into the arm 85. Thus, the supporting member 87 may be swung about the bolt 81 for properly adjusting it angularly relative to the trigger 31 to suit the desires or need of the operator, after loosening the nut on bolt 81 and the clamping screw 90. When the member 87 has been adjusted to the desired angular position, it may be fixed in relation to the arm 85 by tightening the nut on bolt 81 and tightening the clamping screw 90. At this time, it might be well to note that the swinging movement of the pivoted jaw 66 of the C-shaped member 63 may be properly limited such as by providing the tail piece 68 with a depending portion having an arcuate elongated slot 92 through which passes a pin 93 extending transversely through the member 63. The portion of the tail piece 68 provided with the slot 92 may operate in a slot of the member 63 as indicated at 94.

The actuating arm 73 is operatively connected with the driving member 27, and for this purpose member 27 has a pin 95 which projects rearwardly into an angular elongated slot 96 of said arm 73 as shown more clearly in Figure 10. The angular form of slot 96 is such that when the member 27 is initially moved from the position of Figure 7 to the position of Figure 9, the pin 95 will swing the arm 73 upwardly so as to actuate gear segment 59 for swinging the C-shaped member 63 from the position of Figures 7 and 25 to the position of Figures 8 and 26. At this time, the pin 95 has arrived intermediate the ends of slot 96 as shown in Figure 10, and upon further movement of the driving member 27 the pin 95 will pass into the upper nearly vertical portion of slot 96, thus allowing the arm 73 to lower and the parts 70, 71, 59 and 63 to immediately return to the position of Figures 13 and 28. While the C-shaped member 63 returns at this time nearly to normal position, it is prevented for the time being from returning completely to normal position until later on in the knot-tying operation, by a means which will presently be described. The last-mentioned means includes a lever 97 pivoted at 98 to the front wall of the casing section 8 and having an end portion slotted as at 99 to receive a pin 100 projecting forwardly from the driving member 27, the pivoted or unslotted end portion of the lever 97 being provided with an upstanding resilient flexible member 101 projecting toward the pivoted end portion of the C-shaped member 63. Normally, the resilient flexible member 101 is disposed as shown in Figure 7 so that it will not interfere with the the complete return of the member 63 to its initial position. Upon initial movement of the driving member 27 to the position of Figure 8, the lever 97 is rocked to the position of Figure 8 so that it will form a stop engaged by the jaws of member 63, thereby limiting the downward swinging movement of said member 63 to a proper position. After the actuating arm 73 has been allowed to lower for permitting return of the member 63 nearly to initial position as shown in Figure 13, the flexible resilient member 101 will be disposed as shown in said Figure 13 so as to engage member 63 and retain it temporarily slightly short of its initial position. In this way, the member 63 is maintained as shown in Figure 13 for a short period so that the jaws of member 63 will remain closed, the tail piece 68 not having engaged the bottom wall of slot 69 sufficiently to open said jaws. Proper swinging movement of lever 97 in this manner is caused by the engagement of pin 100 in slot 99 of lever 97, and the rocking movement of lever 97 is utilized to effect actuation of the clamps 21 and 22 for clamping the thread inwardly of the slots 13 and 14. For the latter purpose, the lever 97 has an upwardly extending arm including a section 102 rigid with the lever 91, and a section 103 pivoted near its upper end as at 104 to the upper end of the section 102, the upwardly projecting terminal 105 of the section 103 being disposed to impinge the adjacent leg of clamp 21 as shown in Figure 23 so as to flex said clamp and thereby effect the closing of the same and the clamp 22 as hereinbefore previously mentioned and as illustrated in Figure 23. The lower end of section 103 has an elongated slot 106, and a clamping screw 107 passes through this slot and is threaded into the lever 97 so as to secure the arm section 103 in any desired adjustment relative to the arm section 102. Thus, the terminal end 105 of the section 103 can be properly set or adjusted so as to cause closing of the clamps 21 and 22 at the proper time. This actuation of the thread clamps is had for clamping the threads during the entire operation from the position of Figure 8 to the position of Figure 17, it being necessary to hold or grip the threads while the knot is being tied. After the clamps have been closed as in Figure 23, they will remain closed by the actuation of lever 97 through the medium of pin 100. After the driving member 27 reaches the position of Figure 14, wherein the pin 95 has reached the upper end of slot 96 in arm 73, the latter will be shifted to the right of Figure 10 against the action of a spring 108 which bears against an end of arm 73 and normally urges it toward the lever 70, 71. By thus shifting the arm 73 to the right of Figure 10, it is moved so that it may swing upwardly past the lever 70, 71 during the remainder of the knot-tying operation without actuating the C-shaped member 63 so that the latter will remain in its nearly normal position of Figure 14 for the time being. This shifted inoperative position of arm 73 will be apparent from Figures 16 and 17, and the spring 108 is shown as a resilient strip of metal attached at its upper end to the frame member 6 and engaging at its lower end with the right hand end of the arm 73 as viewed in Figure 10. When the driving member 27 is released from the trigger as above explained, the various parts will return to normal position, the arm 73 passing below the lever 70, 71 and then being urged to the left of Figure 14 to restore its operative relation to the lever 70, 71, by means of the spring 108. When driving member 27 thus returns to normal position, the lever 97 will also return to normal position, thereby disengaging the arm 102, 103 from the clamps 21 and 22 so as to release the thread, and at the same time disengaging the flexible resilient member 101 sufficiently from the C-shaped member 63 so that return of the latter to normal position can be completed under the influence of spring 67 for permitting the tail piece 68 to engage the bottom wall of slot 69 and open the jaws of the member 63. Thus, at the completion of the knot-tying operation, the clamps 21 and 22 will release the thread and the thread held by the jaws of the member 63 will be released, immediately after the end of the thread held by the jaws of the rotary tying bill has been released. The latter operation is had just prior to this time through the actuation of the member 47, 48 and in the manner hereinbefore described.

Disposed directly in front of the slotted end of lever 97 is an elongated plate 109 pivoted at one end on a pin 110 projecting forwardly from the frame member 6 through the open central portion of the driving member 27. This pivoted plate 109 has a serpentine slot 111 in which the pin 100 also engages, and rigid with and projecting upwardly from the plate 109 is an arm 112 carrying a roller 113 at its upper end arranged in the path of the tail piece 68 of member 63. The arrangement is such that when the member 63 is swung from the position of Figure 25 to the position of Figure 26 to loop the thread A around the thread B as shown in the last-mentioned figure, the tail piece 68 will engage the roller 113, and further slight movement of member 63 results in actuation of the tail piece 68 by means of roller 113 so as to close the jaws 64 and 66 of member 63, thereby cutting and clamping the tail of the thread A as shown in Figure 27. Thus, when the member 63 returns to the position of Figure 13 and Figures 28 to 30 inclusive, the cut end of the thread A is still held by the jaws of the member 63. Movement of pin 100 in the portion of slot 111 of plate 109 as illustrated from the position of Figure 7 to the position of Figure 8 has no effect, but when the pin moves to the position of Figure 13 the plate 109 is raised so that roller 113 causes actuation of the tail piece 68 for cutting and clamping the thread as described. Further movement of the pin 100 in the slot 111 from the position of Figure 8 to the position of Figure 17 is utilized to cause the actuation of an instrumentality for forcing the partially formed knot off of the shank of the rotary tying bill as illustrated in Figure 29 and for subsequently stripping the knot off of the tying bill and elevating it to the top of the device where the device may be readily disengaged from the threads upon completion of the knot and without the necessity of grasping the threads on the part of the operator.

This instrumentality for forcing the partially formed knot from the shank of the rotary tying bill to the tying bill proper and for stripping the knot from the tying bill proper and elevating it to the top of the casing of the device, includes an ejector and stripper plate 114 pivoted at 115 to a bracket 116 mounted on top of the frame member 6. The plate 114 has a curved elongated slot 117 which is engaged by a pin 118 carrying the roller 113, and the end of plate 114 remote from the pivot 115 is provided with a finger 119 disposed to engage the thread B forwardly of the tying bill when said plate 114 is swung upwardly. Initial upward movement of plate 114 takes place during movement of pin 100 in the slot 111 of plate 109 from the position of Figure 8 to the position of Figure 13 and Figure 28. Upon further movement, there is a period of rest and then the plate 114 is swung upwardly to the position of Figures 16 and 29 so as to force the partially formed knot from the shank of the tying bill to the tying bill proper. Still further upward movement is subsequently imparted to plate 114 so that as it rises from the position of Figures 16 and 29 to the position of Figures 17 and 30, the knot is completed and stripped entirely off of the tying bill as well as elevated to the top of the casing of the knot-tying device. When the ends of the thread are subsequently released as in Figure 18, after the threads have been released by the clamps 21 and 22, the knot-tying device may be readily disengaged from the threads by permitting the latter to pass forwardly from beneath the casing member or portion 17. Thus, it is not necessary to manually grasp the threads so as to disengaged them from the knot-tying device. It will be understood that when the parts have been shifted to the position of Figures 17 and 31, the knot-tying operation will have been completed, and the final movement of trigger 31 from the position of Figure 17 to the position of Figure 18 simply results in release of such trigger from the driving member 27 so that the member 63 can complete its return to normal position while the remaining parts are returned to normal position under the influence of springs 27', 38, 56, 67 and 108.

In using the present device, the operator takes hold of the device by inserting the fingers of the left hand through the handle member 88, with the casing section 8 facing in a general direction toward the operator and with the thumb of his left hand in position to engage the trigger or lever 31. The threads A and B to be joined are grasped with the right hand and extended across the device on respectively opposite sides of the arm or extension 17 and the portions of the casing sections respectively disposed between the slots 13 and 14 and the slots 15 and 16, the tails $a$ and $b$ passing out through the slots 15 and 16 respectively. Thus, one thread A extends transversely on a horizontal elevated plane in a position to be engaged between the fixed jaws 64 and the movable jaw 66 of the member 63 as soon as the latter begins its swinging movement from the position of Figures 7 and 25 to the position of Figures 8 and 26. As will be apparent, the thread A lies in a vertical plane inwardly or in front of the tying bill as well as above the latter, the body of the thread A projecting outwardly through the upper portion of slot 13 over lug 25 of clamp 22, and the tail of said thread A projecting outwardly through the slot 15. The other thread B is extended in a similar manner through and between the slots 14 and 16, across the shank of the tying bill as well as behind the latter on a lower plane than the thread A, as is also shown in Figure 25. Thus positioned, the body of thread B extends outwardly through the slot 14, and the tail thereof extends outwardly of the slot 16. With the threads thus positioned in the device, the operator engages the trigger or lever 31 with the thumb of his left hand and presses the same downwardly and inwardly to effect the cycle of operation now to be described in detail.

Upon the initial movement of the trigger 31, the driving member 27 is rotated outwardly or to the right of Figure 7 so as to cause upward movement of lever arm 73, thereby causing rearward swinging movement of gear segment 59 from the position of Figure 7 to the position of Figure 12 and rotating the member 63 from the position of Figures 7 and 25 to the position of Figures 8 and 26. In swinging in this manner, the member 63 engages the thread A and carries it transversely around the thread B to thereby form a loop L whose bight engages the thread B at the forward side of the tying bill as clearly shown in Figure 26. The open ends of this loop L thus extend on the inner side of the thread B, and during this step the pin 100 has been raised so as to swing the plate 109 upwardly for causing roller 113 to engage tail piece 68 and close the movable jaw 66 of the member 63 so as to shear off the tail end a of thread A and clamp the new end of said thread A as shown in Figure 27. During the above movement of the driving member 27, the shaft 41 has been rotated so as to carry the tying bill around from the position of Figures 7 and 25 to the position of Figure 26 against the loop L, and then to the position of Figure 27 wherein the tying bill is disposed against both end portions of the loop L with the remaining portion of said loop L partially coiled about the shank of the tying bill.

The next step consists in giving further inward movement to the trigger 31 so that the lever 73 is shifted to the right of Figure 10 against the action of spring 108 and thereby disengaged from the lever arm 70, whereupon the spring 67 returns the member 63 nearly to normal position as shown in Figure 13. By this time, the lever 97 has been shifted to the position of Figure 13 so that the flexible resilient member 101 engages member 63 and prevents it from returning completely to its normal position for preventing opening of the jaws of member 63 as yet, and so that the end of thread A will be held by the member 63 as illustrated in Figure 29. In returning from the position of Figures 8 and 26 to the position of Figures 13 and 28, the member 63 carries the end of thread A around the tying bill and then under and around the thread B. During this operation, the tying bill has turned to the position of Figure 28 against the thread B with the latter extended in a plane between the jaws of the tying bill, and the loop L has been completely moved onto the shank of the tying bill and further coiled therearound as shown in said Figure 28. At this time, the stripper and ejector plate 114 will have been elevated to the position of Figure 28 in engagement with the thread B directly forwardly of the loop coiled about the shank of the tying bill.

Figure 29:
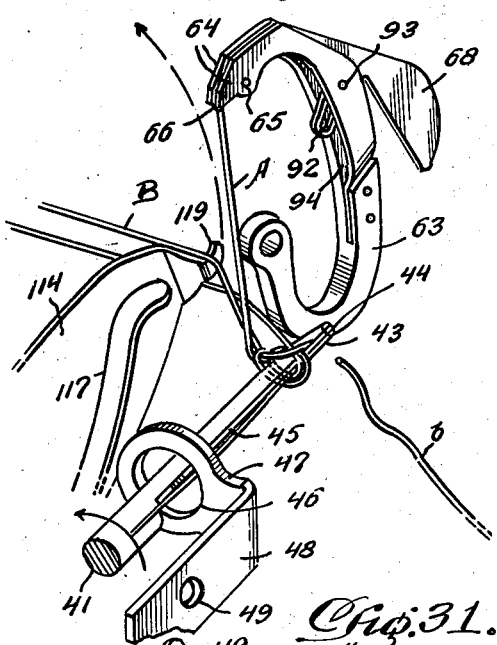

Further inward movement of trigger 31 causes the tying bill to rotate from the position of Figure 28 to the position of Figure 29, during which movement the movable jaw 44 of the tying bill has been closed to shear and clamp the thread B as illustrated in said Figure 29, freeing the tail end b of said thread B as shown. During the entire operation from the initial position of Figure 7 to the position of Figure 17, the lever 97 will have been actuated so as to close the clamps 21 and 22 for gripping the threads and maintain them gripped. Also, in moving from the position of Figure 29 to the position of Figures 16 and 30, the plate 114 has been further elevated so as to first force the partially formed knot from the shank of the tying bill onto the tying bill proper as generally indicated in Figure 29 and to then strip the knot from the tying bill as illustrated in Figure 30. The looping of thread A about the thread B when carried from the position of Figure 25 to the position of Figure 26 resulted in carrying the thread A over the lug 25 of clamp 22 and down to the bottom of slot 13 in advance of actuation of clamp 22 to grip the thread. The further inward movement of trigger 39 from the position of Figures 16 and 29 causes the further elevation of plate 114 necessary for completing the stripping of the partially formed knot off of the tying bill proper and elevating it to the top of the device. This stripping of the partially formed knot off of the tying bill results in drawing the end of thread B around the loop L to form a second loop L' in the thread B and to draw said end of thread B between the other end portion of loop L' and the loop L, so as to complete the knot. In elevating the knot after it has been stripped from the tying bill as illustrated in Figures 30 and 31, the knot will be tightened, and during the final upward movement of plate 114 the actuation of member 47 and 48 will take place so as to open the jaws of the tying bill and release the end of thread B. This occurs immediately before the member 63 is released by disengagement of the flexible member 101 therefrom and when the jaws of said member 63 are opened to release the thread A by engagement of the tail piece 68 with the bottom wall of slot 69. When the ends of the threads are thus released immediately upon tightening the knot and elevating it to the top of the casing as illustrated in Figures 18 and 31, the operator may readily disengage the device from the threads by moving the device rearwardly and causing the threads to pass outwardly from beneath the arm or extension 17. The upward movement of stripper and ejector plate 114 is obviously effected by the actuation of plate 109 through the means described, and just before the driving member 27 has reached its limit of movement to the right as shown in Figure 17 further inward movement of trigger 31 simply results in actuation of lever plate 34 for effecting release of the trigger 31 from the driving member 27 in the manner previously described. It will be apparent that the pin 110 limits the swinging movement of the driving member 27 to its normal position or to the left with respect to the several views, such as Figure 9, and when the trigger 31 has been released from driving member 27, instantaneous return of the several parts and instrumentalities to normal position will be had. This is true even though the trigger 31 is still gripped, and when said trigger is released it will return to its normal position and again engage the driving member 27 automatically under the influence of springs 36 and 33. It will be apparent that the jaws of the tying bill would not open at the desired time as illustrated in Figure 31 if the member 47, 48 were stationary. Hence the necessity for pivoting this member and causing swinging of the same when the parts reach the step illustrated in Figure 31, through the medium of the arm 49 operatively associated with the driving member 27 and connected with the member 47, 48 as previously described. Opening of the jaws of the member 63 and the tying bill, at the proper time and automatically, renders it unnecessary to manually pull the threads to disengage them from these parts after completion of the knot-tying operation. Also, it will of course be understood that various changes and modifications of the invention and in the details thereof are possible and contemplated without departing from the spirit of the invention. The tying bill may of course be rotated in either direction, depending upon the specific character of the weaver's knot to be formed. Rotation of the bill in one direction will of course result in a right hand knot, while rotation of it in an opposite direction will cause the production of a left hand knot. These are elementary possible modifications of the invention, and the form of the knot produced is clearly evident from Figure 31 and generally well known in the art.

It will be seen that I have provided a novel and useful device for carrying out the stated objects of the invention in an improved and most efficient manner.

What I claim as new is:

1. In a knotter, the combination of knot-tying instrumentalities, a driving member operatively connected to said instrumentalities, a laterally shiftable trigger releasably connected with said operating member, and means for laterally shifting said trigger to automatically release the trigger from said driving member upon completion of the knot-tying operation.

2. In a knotter, the combination of knot-tying instrumentalities, a driving member operatively connected to said instrumentalities, a laterally shiftable trigger releasably connected with said operating member, means for laterally shifting said trigger to automatically release the trigger from said driving member upon completion of the knot-tying operation, spring means to return said instrumentalities to normal position upon release of the trigger from said driving member, and spring means to return the driving member to normal position when the trigger is released therefrom.

3. In a knotter, the combination of knot-tying instrumentalities, a driving member operatively connected to said instrumentalities, a laterally shiftable trigger releasably connected with said operating member, means for laterally shifting said trigger to automatically release the trigger from said driving member upon completion of the knot-tying operation, spring means to return said instrumentalities to normal position upon release of the trigger from said driving member, spring means to return the driving member to normal position when the trigger is released therefrom, and spring means to return the trigger to normal position when the latter is released by the operator after it is released from the driving member.

4. In a knotter, the combination of a casing having guides for supporting a first thread and a second thread, trigger-operated instrumentalities within said casing for tying said threads into a weaver's knot, said instrumentalities including a rotating tying bill on which the knot is partially formed, and means operated by the trigger to force the partially formed knot partly off of the tying bill and then subsequently strip the partially formed knot completely from the tying bill to complete the knot and elevate it to the top of the casing.

5. In a knotter, the combination of trigger-operated knot-tying instrumentalities including a rotatable tying bill having cutting and clamping jaws, a jaw of said tying bill being movable and having an extension, a movable member having an opening receiving said extension and eccentrically disposed to operate the movable jaw for cutting and clamping a thread, and means operated by the trigger to move said movable member at the completion of the knot-tying operation so as to open the movable jaw and release the thread from the tying bill.

6. In a knotter, knot-tying instrumentalities including a member for looping one thread around another thread, said member having thread cutting and clamping means including a movable jaw provided with a tail piece, means to return said member toward normal position after forming the loop, means to arrest said member and maintain it short of complete return to normal position after forming the loop and while formation of the knot is being completed, means to release said member for complete return to normal position after completion of the knot, means to actuate the tail piece upon such complete return of said member so that the thread is released from its cutting and clamping means, and means to return the remaining of said instrumentalities to normal position upon completion of the knot and release of said member.

7. In a knotter, the combination of a casing having front and rear walls provided with pairs of thread-receiving slots, resilient thread gripping clamps mounted on the front wall of the casing adjacent the slots of the latter, trigger-operated knot-tying instrumentalities within the casing, means for actuating one of the clamps to cause gripping of one of the threads during the knot-tying operation, and means affording an operative connection between said clamps whereby the operation of said one clamp will cause operation of the other for causing said other clamp to grip another thread during such knot-tying operation.

8. In a knotter, the combination of a casing having front and rear walls provided with pairs of thread-receiving slots, resilient thread gripping clamps mounted on the front wall of the casing adjacent the slots of the latter, trigger-operated knot-tying instrumentalities within the casing, means for actuating one of the clamps to cause gripping of one of the threads during the knot-tying operation, means affording an operative connection between said clamps whereby the operation of said one clamp will cause operation of the other for causing said other clamp to grip another thread during such knot-tying operation, said knot-tying instrumentalities including a member for looping one thread around the other, the clamp-operating means including a member having a part for limiting the movement of the thread-looping member, means to return said thread-looping member toward normal position upon completion of the loop and prior to completion of the knot, said member being operated to arrest said thread-looping member short of return to normal position during completion of the knot-tying operation and to permit complete return of said member to normal position upon completion of the knot, said thread-looping member having thread cutting and clamping means including a movable jaw provided with means operable to open said cutting and clamping means when complete return of said thread-looping member to normal position is permitted.

9. In a knotter, trigger-operated knot-tying instrumentalities including a rotatable tying bill having a shank on which the knot is partially formed, and means including a stripper and ejector plate engageable with one of the threads being tied for forcing the partially formed knot off of the shank of the tying bill onto the tying bill proper and then stripping the partially formed knot from the tying bill proper to complete the knot and then elevate the knot for ejection from the knotter without manual grasping of the thread.

10. In a knotter, a rotary tying bill having cutting and clamping jaws, a thread-looping member having cutting and clamping jaws, a driving member having an operating trigger, a member actuated by said driving member and having a part arranged to cause the jaws of the thread-looping member to cut and clamp a thread upon formation of the loop, a stripper and ejector plate operated by the last-named member for stripping a partially formed knot off of the tying bill to complete the knot and for elevating the complete knot considerably above the tying bill in a position where the knotter may be readily disengaged from the threads without manually grasping the latter.

11. In a knotter, a rotary tying bill having cutting and clamping jaws, a thread-looping member having cutting and clamping jaws, a driving member having an operating trigger, a member actuated by said driving member and having a part arranged to cause the jaws of the thread-looping member to cut and clamp a thread upon formation of the loop, a stripper and ejector plate operated by the last-named member for stripping a partially formed knot off of the tying bill to complete the knot and for elevating the complete knot considerably above the tying bill in a position where the knotter may be readily disengaged from the threads without manually grasping the latter, means to return the thread-looping member toward normal position upon forming the loop and prior to completion of a knot, means to retain the thread-looping member near but not quite to returned normal position while the knot is being completed, and means to operate the last-named means for permitting complete return of the thread-looping member to normal position upon completion of the knot, said thread-looping member having a movable jaw provided with a tail piece, and means engageable with said tail piece to release the cutting and clamping means of the thread-looping member when the latter is permitted to completely return to its normal position.

12. In a knotter, thread tying instrumentalities, a driving member for said instrumentalities, a trigger for operating said driving member movable laterally into and out of operative engagement with the latter, yieldable means for moving the trigger into operative engagement with the driving member, and a lever engageable by the trigger to shift the latter out of engagement with the driving member upon completion of the knot-tying operation.

13. In a knotter, knot-tying instrumentalities including a rotary tying bill having thread cutting and clamping jaws, an apertured member for operating a movable one of said jaws for causing a thread to be cut and clamped by the tying bill during the knot-forming operation, said apertured member being mounted for movement relative to the tying bill, and means to automatically move said apertured member to effect release of the thread held by the cutting and clamping jaws of said bill upon completion of the knot-tying operation.

WILLIAM A. HUFFSTICKLER.